(12) United States Patent
Blevins

(10) Patent No.: US 7,600,249 B1
(45) Date of Patent: Oct. 6, 2009

(54) SYSTEMS AND METHODS FOR SERVICE PROVISIONING OF MULTIPLE DWELLING UNITS

(76) Inventor: Garry D. Blevins, 9310 Old Waterloo Rd., Warrenton, VA (US) 20186

( * ) Notice: Subject to any disclaimer, the term of this patent is extended or adjusted under 35 U.S.C. 154(b) by 281 days.

(21) Appl. No.: 11/428,099

(22) Filed: Jun. 30, 2006

Related U.S. Application Data

(60) Provisional application No. 60/698,489, filed on Jul. 13, 2005.

(51) Int. Cl.
*H04N 7/18* (2006.01)
(52) U.S. Cl. .............................. 725/78; 725/82; 725/86
(58) Field of Classification Search .............. 725/8, 725/78, 82, 86, 91, 104, 1
See application file for complete search history.

(56) References Cited

U.S. PATENT DOCUMENTS

| | | | | |
|---|---|---|---|---|
| 5,523,781 A * | 6/1996 | Brusaw | ........................ | 725/151 |
| 5,835,128 A * | 11/1998 | Macdonald et al. | ............ | 725/81 |
| 5,905,942 A * | 5/1999 | Stoel et al. | ....................... | 725/78 |
| 6,029,195 A | 2/2000 | Herz | | |
| 6,134,419 A * | 10/2000 | Williams | ..................... | 725/151 |
| 6,466,660 B1 | 10/2002 | Merriam | | |
| 6,622,307 B1 * | 9/2003 | Ho | .............................. | 725/120 |
| 6,857,023 B2 | 2/2005 | Rivadella et al. | | |
| 6,952,836 B1 | 10/2005 | Donlan et al. | | |
| 7,239,698 B2 * | 7/2007 | Phillips et al. | ......... | 379/413.03 |
| 2002/0033416 A1 | 3/2002 | Gerszberg et al. | | |
| 2002/0035648 A1 | 3/2002 | Rivadalla et al. | | |
| 2002/0092021 A1 * | 7/2002 | Yap et al. | ....................... | 725/55 |
| 2004/0060074 A1 * | 3/2004 | Basawapatna et al. | ....... | 725/131 |
| 2004/0075679 A1 | 4/2004 | Carter et al. | | |
| 2005/0278735 A1 | 12/2005 | Boothe | | |
| 2005/0283791 A1 * | 12/2005 | McCarthy et al. | ............... | 725/1 |
| 2006/0041914 A1 | 2/2006 | Seiden et al. | | |
| 2006/0107293 A1 * | 5/2006 | Ma | .............................. | 725/74 |

OTHER PUBLICATIONS

KingSmart 2005 v2 Hotel Property Management System, http://www.compw.com/Hotel_Property_Management_System.htm, 5 pages (2005).
Residential VoIP Service Module—Ceon Corporation, http://www.ceon.com/residentialvoipsm.html, 2 pages (2005).

(Continued)

*Primary Examiner*—Christopher Kelley
*Assistant Examiner*—Mulugeta Mengesha
(74) *Attorney, Agent, or Firm*—Nixon & Vanderhye P.C.

(57) ABSTRACT

Systems and methods for providing goods and services from one or more service providers to consumers, such as multiple dwelling unit (MDU) tenants are provided. In a first aspect, the invention provides a system for facilitating the provision of goods and services to a tenant of an MDU operated by an MDU operator. In one implementation, the system of the invention comprises at least one service provider that is configured to provide goods and services; an MDU tenant interface configured to communicate MDU tenant requests for goods and services to one of the MDU operator and the service provider; and a coordinating site configured to provide a provision interface operably connected to the service provider and the MDU tenant interface.

19 Claims, 4 Drawing Sheets

OTHER PUBLICATIONS

Video on Demand: Deliver the Content That Delivers the Customers, Ciena, http://www.ciena.com/products/productsapps_vod.thm, 2pages (2005).

BackOffice Software Suite for Broadband Video-On-Demand (VOD), Concurrent Computer Corporation, 4 pages (Dec. 1999).

Court, Ayeshi, Special for USA Today, "Hotels to make your stay personal," 3 pages (Dec. 24, 2005).

DiLeva, Michael, "People + Process + Product = Success," Unisys: Transportation, Insights, White Paper, Hotel high-speed Internet access HSIA, 3 pages (2005).

"Video on Demand," vod elitecore.com, http://www.elitecore.com/vodsolutions.htm, 1 page (2005).

Elitecore Technologies Ltd., "About Us," http://www.elitecore.com/whovr.htm 1 page (2005).

Elliott, Robert, Hospitality Industry Technology Integration Standards, 4 pages (2000).

"Welcome to EnReach Technology, Inc!!" http://www.enreach.com/news.do?cmd=show&id=1011, 3 pages (2005).

Press Release: 2002, ARESCOM presents a Hospitality Industry 1st: Video on Demand to Laptops in High Speed Internet Access environment, 3 pages (2002).

Galerno, Eda, "Case History: Hotel Chain Uses Data To Pamper Its Guests," Chief Marketer, 3 pages (Aug. 11, 2005).

GLDS. Hotel Pay Per view. [Online] 2003. Available: http://www.cablebilling.com/content.asp?page=4 (2003).

Hotel Online. Reliable fast secure no transaction fees- Ramesys offers hosting service for both their independent hotel and chain customers. [Online] 2003. Available: http://www.hotel-online.com/News/PR2003_4th/Dec03_RamesysChains.html (Dec. 4, 2003).

Intec. Intec Telecom Systems PLC—Overview. [Online] 2005. Available: http://www.intec-telecom-systems.com/its/aboutus/overview/ (2005).

Y. Patel. The on demand challenge. [Online] 2005. Available: http://www.totaltele.com/View.aspx?ID=75397&t=4 (2005).

S. . Schwartz. Preparing Billing and OSS for IP-TV. [Online] 2005. Available: http://www.billingworld.com/archive-detail.cfm?archiveId=7651 (2005).

Yahoo! Oxford Media Inc. Profile. [Online] 2005. Available: http://finance.yahoo.com/q/pr?s=OXMI.OB (2005).

Ceon Corporation. IP-TV (Video) Service Module. "Online " 2005. Available: http://www.ceon.com/iptv.html (2005).

Yahoo? Oxford Media Completes Beta Testing of Proprietary Hotel Video-on-Demand and Pay-per-View System. [Online] 2005. Available: http://biz.yahoo.com/iw/050923/096070.html (2005).

Ceon Corporation. About Us. [Online] 2005. Available: http://www.ceon.com/company.html (2005).

Ceon Corporation. HSDS Service Module. [Online] 2005. Available: http://www.ceon.com/highspeeddatasm.html (2005).

Ceon Corporation. Inter-Carrier Service Module. [Online ] 2005. Available: http://www.ceon.com/intercarriersm.html (2005).

Ceon Corporation. Intelligent Order Manager. [Online] 2005. Available: http://www.ceon.com/intelligentom.html (2005).

* cited by examiner

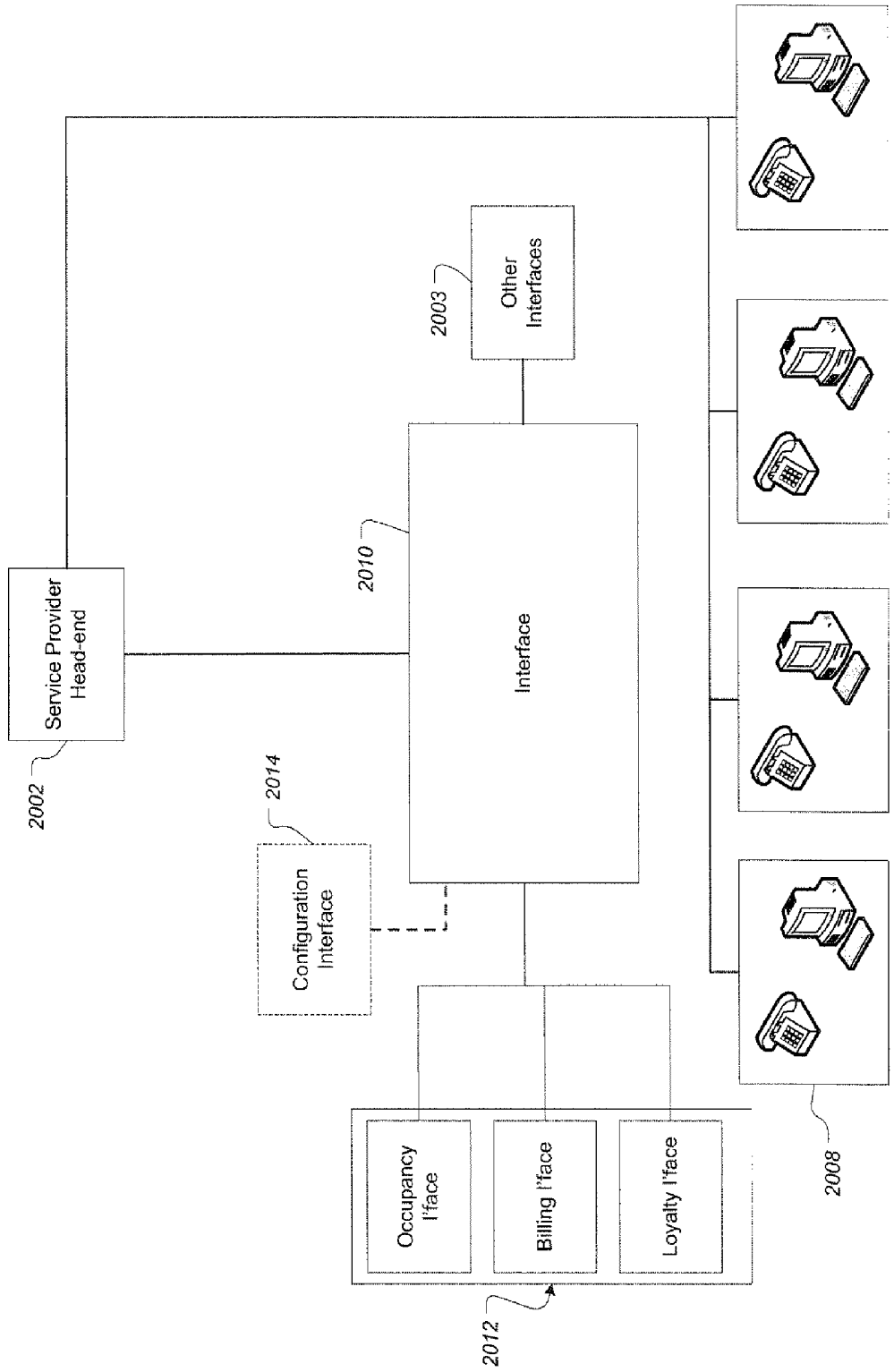

SYSTEMS AND METHODS FOR SERVICE PROVISIONING OF MULTIPLE DWELLING UNITS

CROSS REFERENCE TO RELATED U.S. PATENT APPLICATIONS

The present application claims priority under 35 U.S.C. § 119(e) from provisional U.S. Patent Application Ser. No. 60/698,489, filed on 13 Jul. 2005, which is incorporated herein by reference in its entirety and for all purposes.

COPYRIGHT NOTICE

A portion of the disclosure of this patent document contains material that is subject to copyright protection. The copyright owner has no objection to anyone reproducing the patent disclosure as it appears in the Patent and Trademark Office patent files or records. However, the copyright owner strictly reserves all other copyrights.

FIELD

The technology herein relates to the delivery of electronic and computational services to consumers. More specifically, the technology herein provides methods, systems, and apparatus for the delivery of electronic and computational services to consumers in multiple dwelling units. The technology herein has applications in the areas of electronic commerce, computer science, computer networking, and electronics.

BACKGROUND AND SUMMARY

Traditional business models between multiple dwelling unit (MDU) operators (entities that operate MDUs) and analog- or digital-based telecommunications service providers, such as cable TV operators, include a fixed fee per unit based upon average unit occupancy rate, a fixed fee for basic service, and other payment models that compensate the service provider based upon a fixed payment per unit of service. Typically the service is selected from a pre-determined package of options available to the tenant of the MDU. These business models are sufficient for MDU facilities where service usage is relatively constant and few additional services are purchased; but they become economically inefficient if there are large swings in average unit occupancy, or if the MDU tenants desire additional services beyond the "one-size-fits-all" service.

A traditional analog-service MDU architecture, such as the one shown in FIG. 1, might involve multiple service providers (1000), for example, a cable systems provider, a pay-per-view (PPV) provider (such as SpectraVision or LodgeNet), a telephony provider, and a satellite television provider. The cable provider provides a single cable feed to an MDU operator (1022); and the feed is integrated into the premise's head-ends within the MDU (e.g. 1012). Similarly, the PPV provider provides and optionally caches their PPV materials at the MDU, and integrates these materials into an MDU operator's head end. The caching operation limits the number and currency of PPV materials available to the MDU tenants. Generally, the PPV provider sells an MDU operator their head-end; however, the MDU head-end may come from a variety of sources Telephony service is provided externally to the system, using a separate PBX and telephone system. The usage data is collected by an MDU operator and forwarded to MDU billing (1024) which forwards the charges to the tenants and settles payments with the service providers. Similar MDU architectures exist for satellite TV providers, such as DirectTV or DISH network, as well as alternative providers for cable systems, PPV, and telephony services.

The inefficiencies of the traditional business models are evident by the proliferation of work-arounds for pay-per-view, telephony, and network services. For example, SpectraVision provides a redundant cable head-end, and requires an MDU operator to provide additional in-facility wiring to support the additional SpectraVision equipment. Similarly, local telephone services require additional wiring and hardware investments by MDU operators. These costs have, until now, been largely unavoidable and are part of the cost of being competitive in the MDU marketplace.

Other business schemes, such as billing from a hotel to a credit card, provide a partial alternative mechanism for payments. But this type of scheme severs (or "dis-intermediates") an MDU operator from the flow of services and provides points of contention between an MDU operator, their tenant(s), and the service provider for service delivery problems; and it imposes significant costs on the service provider for operating a redundant end-user payment processing operation. None of these schemes permit the collection and use of MDU tenant demographics and the targeting of services and content to these tenants based upon MDU tenant demographics.

With the advent of digital services, service provider business models require the provision of value added digital services to their subscriber community, including MDU tenants. Digital services further permit the tailoring of delivered content, such as advertising, to specific users. However, the historical unavailability of MDU tenant demographic information makes these programs less valuable to service providers serving MDU tenant populations.

Thus, new technologies are necessary to address the current inefficient business models that prevent greater adoption of usage charged services and content by MDU. The technology herein meets these and other needs.

An exemplary illustrative non-limiting implementation provides a system for providing goods and services, such as personally identified converged media services, from one or more service providers to consumers, such as MDU tenants, in one or more MDU tenant dwelling units that are managed by an MDU operator. The exemplary illustrative non-limiting implementation provides a system for facilitating the provision of goods and services to a multiple dwelling unit (MDU) tenant of a operated by an MDU operator. In one exemplary illustrative implementation, the system comprises at least one service provider that is configured to provide goods and services in response to electronic requests for such goods and services; an MDU tenant interface located in at least one of the dwelling units configured to communicate MDU tenant requests for goods and services to one of the MDU operator and the service provider; and a coordinating site configured to provide a provision interface operably connected to the service provider and the MDU tenant interface to enable the service provider and the MDU tenant to arrange for the provision of the goods and services.

In another, more specific, non-limiting implementation, the coordinating site is further configured to provide information related to at least a portion of the consumption of the goods and services by the MDU tenant to the MDU operator. In another exemplary illustrative non-limiting implementation, each of the MDU tenant interface, the provision interface, and the coordinating site is configured to support IP-based services. Still other exemplary implementations further comprise physical connections between the MDU tenant interface, the service provider, and the provision interface; or at least one interface between the service provider and the MDU operator (or both). In still other exemplary illustrative non-limiting implementations, the coordinating site includes at least one interface for at least one of billing, occupancy, and loyalty systems; a configuration interface for the MDU operator (or both).

Another exemplary illustrative non-limiting implementation provides a multiple unit dwelling comprising the system for facilitating the provision of goods and services as described above.

A further exemplary illustrative non-limiting implementation provides a method for transacting services between one or more providers of goods and services and a multiple dwelling unit (MDU) tenant operated by an MDU operator. Some non-limiting implementations provide an MDU tenant interface in at least one dwelling unit, the MDU tenant interface being configured to communicate MDU tenant requests for goods and services to the service provider; and provide a coordinating site to coordinate the provision of at least one aspect of the goods and services between the service provider and the MDU tenant. Other non-limiting exemplary implementations further comprise providing at least one service from an MDU operator. Still other implementations further comprise providing a network interface port configured to allow the service provider to communicate with the MDU operator.

Other exemplary illustrative non-limiting implementations further comprise enabling the provision of a service from the service provider to the MDU tenant interface, disabling the provision of a service from the service provider to the MDU tenant interface, or both. In some more specific implementations, the service provided by the MDU operator includes a billing service.

Some non-limiting implementations further comprise providing the MDU operator information related to at least a portion of the consumption of the goods and services by the MDU tenant to the MDU operator. In other exemplary implementations, such providing further includes the MDU operator providing a billing service.

Other exemplary illustrative non-limiting implementations further comprise translating information provided by the service provider to information stored by the MDU operator. In more specific implementations, the method further includes associating information provided by the service provider to a specified dwelling unit. Still other exemplary illustrative non-limiting implementations include providing the MDU operator information related to at least a portion of the consumption of the goods and services by the MDU tenant to the MDU operator in addition to the foregoing. Yet other exemplary implementations also include providing a billing service from the MDU operator as well.

BRIEF DESCRIPTION OF THE DRAWINGS

These and other features and advantages will be better and more completely understood by referring to the following detailed description of exemplary non-limiting illustrative implementations in conjunction with the drawings of which:

FIG. 2B is a schematic overview of an exemplary illustrative non-limiting system for providing telecommunications-based services.

DETAILED DESCRIPTION

The technology herein addresses the limitations of the prior art by providing, in one aspect, a systems architecture that supports the integration of converged-media services (including, but not limited to, cable, and satellite television, pay-per-view (PPV) programming, Internet access, and other services that can be transacted over telephone or computer networks), as well as the billing for, and provisioning of such services to one or more multiple dwelling unit (MDU) tenants. The exemplary illustrative non-limiting systems architecture also supports the provisioning of goods as well, and of goods and services together. As used herein, an MDU is a structure that provides a permanent or temporary dwelling (e.g., residence or office) for one or more tenants or occupants ("MDU tenants") who are consumers of goods and services, such as converged-media services, provided by service providers (e.g., the aforementioned converged-media providers). Such architectures will be seen by those having ordinary skill in the art as being effective to reduce, even eliminate, the above-described inefficiencies associated with redundant hardware systems, specialized equipment, and redundant customer-centric services such as multiple billing entities. More specifically, the systems architecture provided by an exemplary illustrative non-limiting implementation permits a reduction in up-front and maintenance costs by reducing the fixed wiring plant to, in one implementation, a single drop per unit; the reduction or elimination of premises equipment for goods and services, such as converged media services; and the corresponding reductions in equipment, staffing, repair, and maintenance costs. In some non-limiting exemplary implementations, the architecture further supports the elimination of at least a portion of the wired infrastructure within the MDU premise by enabling wireless service delivery; thereby effectively delivering combined services to an MDU tenant in whatever format they can accept the information.

The exemplary illustrative non-limiting system also provides a mechanism to enable shared business models between MDU operators and the service providers, while improving the end-user customer experience of MDU tenants by providing additional features and capabilities that were previously unavailable to MDU tenants by using a common provider interface. These shared business models open new business opportunities for both the MDU operator and the service provider.

General System Structure and Operation

Figure 1:
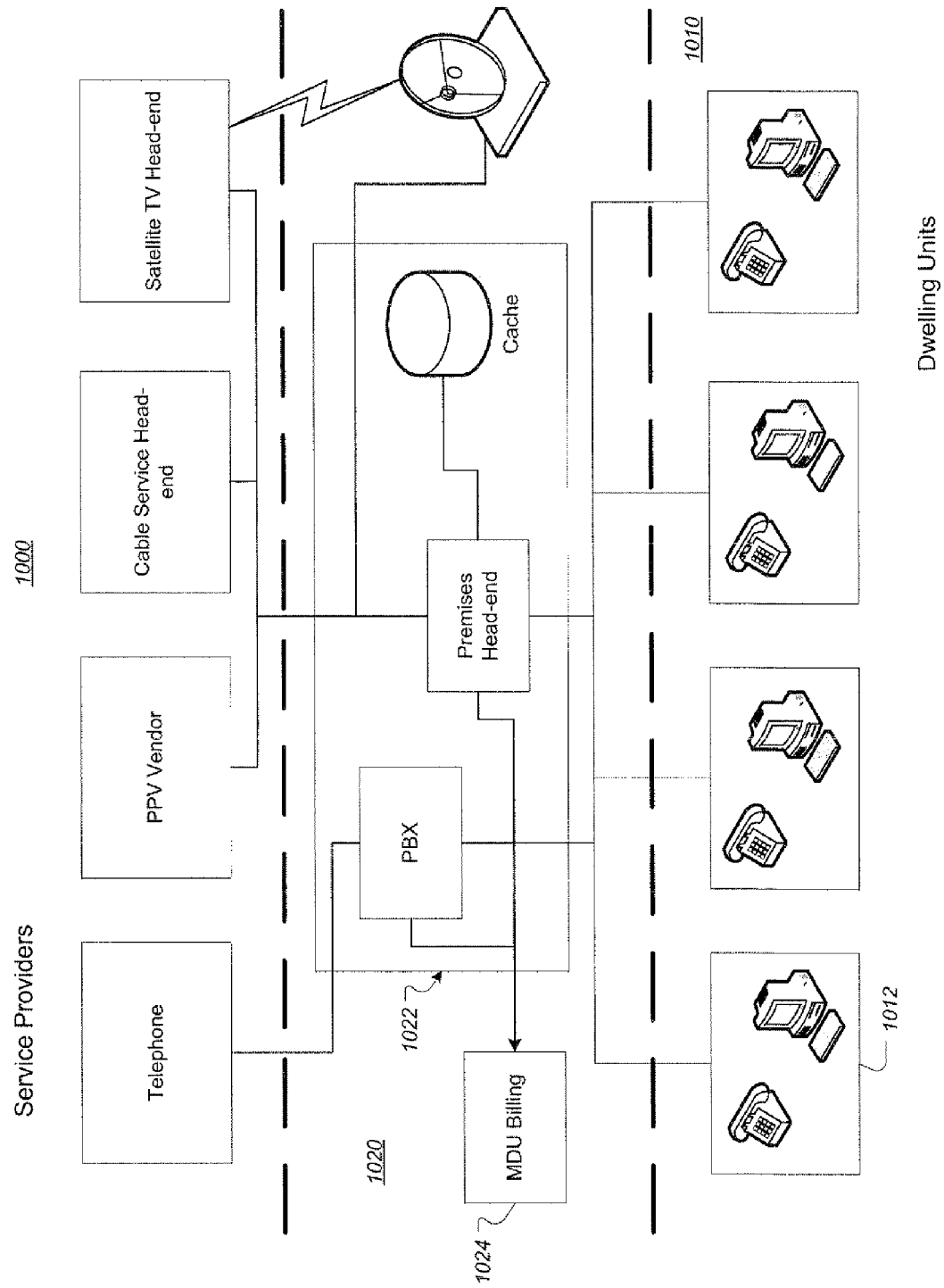
FIG. 1 is a schematic overview of a systems architecture for providing telecommunications-based services in the prior art.
Figure 2A:
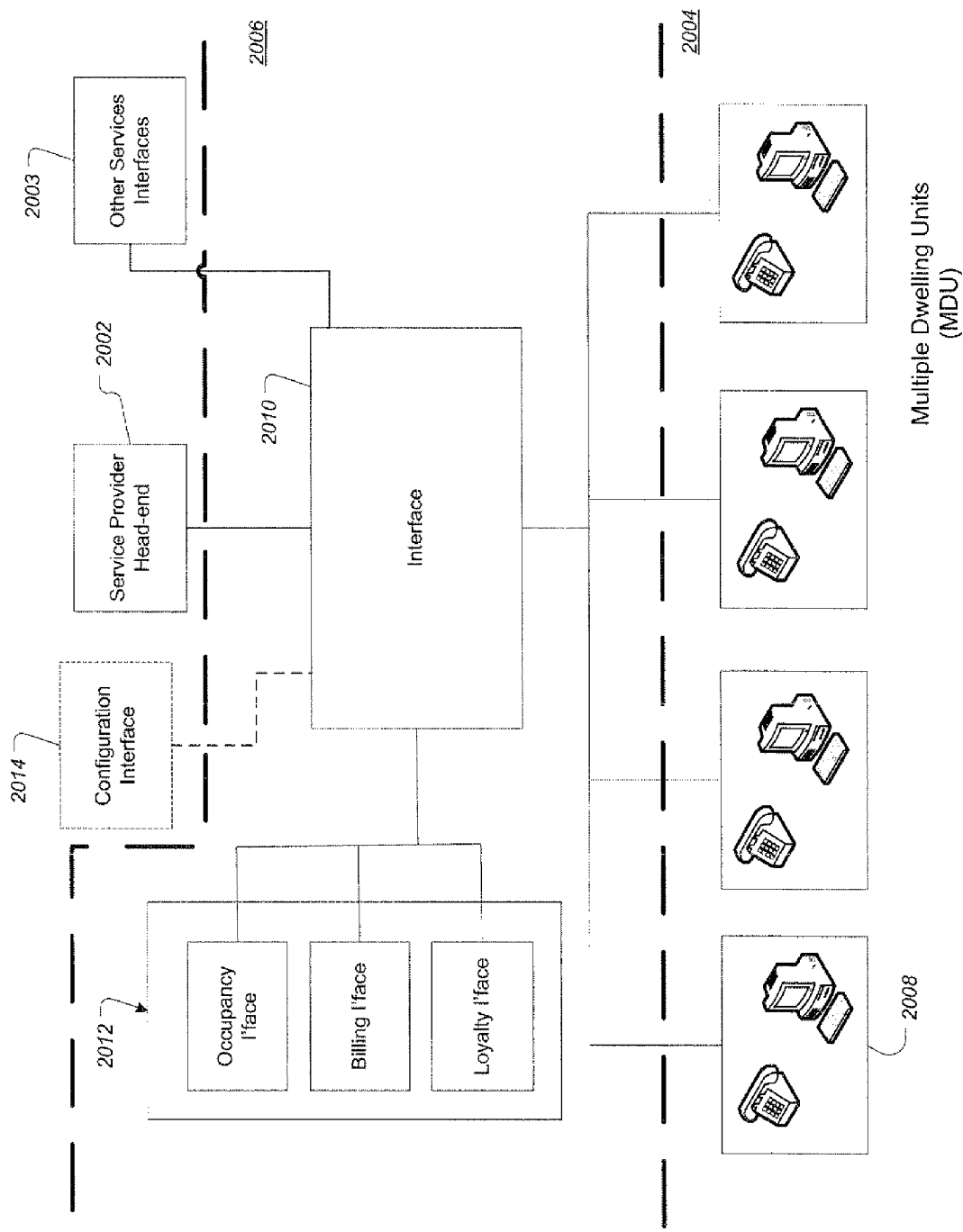
FIG. 2A is a schematic overview of an exemplary illustrative non-limiting system for providing telecommunications-based services.

One exemplary implementation of an MDU architecture is shown in FIG. 2A. There, a plurality of service and content providers (2002, 2003) provide their goods and services (and content) to MDU tenants (2004) resident in an MDU operated by one or more MDU operators (not shown). Collectively, each instance of this type of point-of-presence equipment is referred to as an MDU tenant interface (2008). In one implementation, the service and content providers provide their services and content over a service provision network, which operably connects the service and content providers, the MDU tenants, and an MDU operator. In a more specific non-limiting implementation, the services are provided to the MDU tenants using traditional point-of-presence equipment such as a digital cable set-top box or VoIP interface device. In this exemplary architecture, a service provider, such as the cable provider Comcast, provides digital cable interface units, such as a set-top box or a cable modem commercially available from Scientific Atlanta, to an MDU operator. IP telephony service providers may provide IP-enabled telephones, such as those commercially available from Cisco Networks, conventional telephones and other point-of-presence equipment, such as commercially available from Vonage, or other technologies as supported by equipment already present in the MDU unit. The MDU tenant interface(s) are installed in each MDU unit, either by an MDU operator, by a service provider, or are provided by the MDU tenant, and are operably connected to MDU tenant equipment (not shown) using appropriate connection means. Alternatively, MDU tenant interface(s) may be installed in a wiring closet or other facilities-centric location and operably connected to MDU tenant equipment using wired or wireless technologies as described herein. An MDU tenant interface may be identified to the service device using a service provider account. The account may comprise one or more of an "account number", a MAC address, an IP address, a globally unique ID, a device ID, a device name, or other attribute that uniquely identifies at least part of the an MDU tenant interface. A plurality of identifiers may be associated with each MDU tenant interface. Each MDU tenant interface may be associated with an "account" of at least one service provider.

An Interface (2006) including an Interface system (2010) is also provided between a service provider and an MDU, and is operably connected to both the service provider and at least one MDU tenant. In one exemplary implementation, the Interface system (2010) is a combination hardware system and software application, deployable, for example, as a PC or a network appliance, which provides a plurality of configurable logical interfaces to service providers (2002, 2003), MDU operator systems (2012), and MDU tenant interface(s) (2008). In some exemplary implementations (not shown), a plurality of Interface systems (2010) may be provided to provide fault tolerance, redundancy, or load sharing.

The connection between the MDU and a service provider is called the "service provision network". The service provider's interface to the service provision network is called a service provider interface, and serves as a proxy for service provider systems such as content provision, account management, and billing. The interface system (2010) permits an MDU operator to provide services on behalf of a service provider (for example, billing), and for a service provider to provide services to the MDU tenant on behalf of an MDU operator (for example, provision of converged media MDU tenant services such as cable, PPV, and IP telephony services), and optionally provides an interface for the correlation and exchange of service-related information. The Interface system's interface to the service provision network may, in some exemplary implementations, be provided by a cable set-top box or cable modem, or may be provided using alternative technologies. Further, the interface may be provided by a third-party provider, such as an ISDN or DSL network connection, or even a traditional telephone dial-up connection. A service provider may optionally provide a dedicated interface port to the service provider systems for an MDU operator to communicate service provider systems as part of the service provider interface.

The MDU tenant interface may be connected to a service provision network using a physical connection (e.g. cable, telephony wiring, or IP network interface), or it may be provided using a wireless interface such as those provided by various wireless approaches such as 802.11-b/-g or the emerging WiMax mechanisms. In a more specific exemplary implementation, the MDU tenant interface comprises a plurality of network interfaces that support cable and IP-based services. In another exemplary illustrative non-limiting implementation, a single MDU tenant interface may comprise a plurality of virtual network interfaces. Each MDU tenant interface may be uniquely identified using a unique identifier, such as an IP address, Ethernet MAC address, a device's globally unique ID (e.g., UUID or GUID), or other identity mechanism as may be implemented by the MDU tenant interface. In some exemplary implementations, the unique identifier may be shared between one or more MDU tenant interfaces.

In-unit converged services, including PPV, network services and IP-based telephony services may be provided using at least one of these MDU tenant interfaces. In these cases, an MDU operator's fixed costs may be further reduced by permitting an MDU operator to eliminate the fixed costs of MDU premise telephone systems, including the PBX, voice mail, premise instruments, and most fixed telephone lines. The MDU premise telephone system services may be outsourced to at least one third party, or if an MDU operator operates multiple MDU facilities, to a common MDU operator-controlled facility. The Interface system (2010) supports the provisioning of these outsourced components; both for the provisioning of basic telephony services to the MDU units and for the provisioning of additional value-added telephony-based services such as "follow me" telephone and voice mail services.

In another exemplary illustrative implementation, shown in FIG. 2B, the Interface system (2010) also provides interfaces to MDU operator systems via MDU operator system interfaces (2012). These MDU operator systems may include billing, occupancy management, loyalty, and other systems as will be apparent to those having ordinary skill in the art. Each MDU operator systems may be physically located at an MDU operator premises, or they may be located at an external site. Additionally, each MDU operator system may be shared between multiple MDU premises, or it may be dedicated to a specific MDU premise.

The MDU operator system interfaces (2012) comprise interfaces to the MDU operator systems described above, including the MDU billing system, the MDU occupancy management system, and the MDU loyalty system, and such other MDU operator systems as interfaces are required. The MDU operator system interfaces comprise any software and hardware effective to connect to Interface system (2010), for example, serial, parallel, or network interfaces, as will be understood by those having ordinary skill in the art.

Finally, the interface system (2010) may have a configuration interface (2014) that may comprise a serial or parallel interface, a network interface (such as a Web interface), or it may provide the interface using a traditional keyboard, monitor, and mouse. In another exemplary implementation, one or more of the above-described interfaces (or any other interface not shown) is collapsed into a single physical Ethernet or other networking interface, with optional security provided by VPN or other encryption methods.

In an alternative implementation, the service provision network connects the service provider interface(s) and MDU tenant interfaces, and further connects between the service provider interface(s) and the interface system(s) (2010). These connections are substantially made in parallel, and may be made using parallel or shared network topologies as known to those skilled in the art. Network traffic on the service provision network may be physically isolated on separate physical networks, logically separated on a single network, or co-mingled on a single network. Different portions of the service provision network may utilize different network traffic management schemes. This second arrangement off-loads some of the connection burden and traffic to the interface system (2010). However, the details of the connections and operations are substantially as described above with respect to FIG. 2A.

Figure 3:
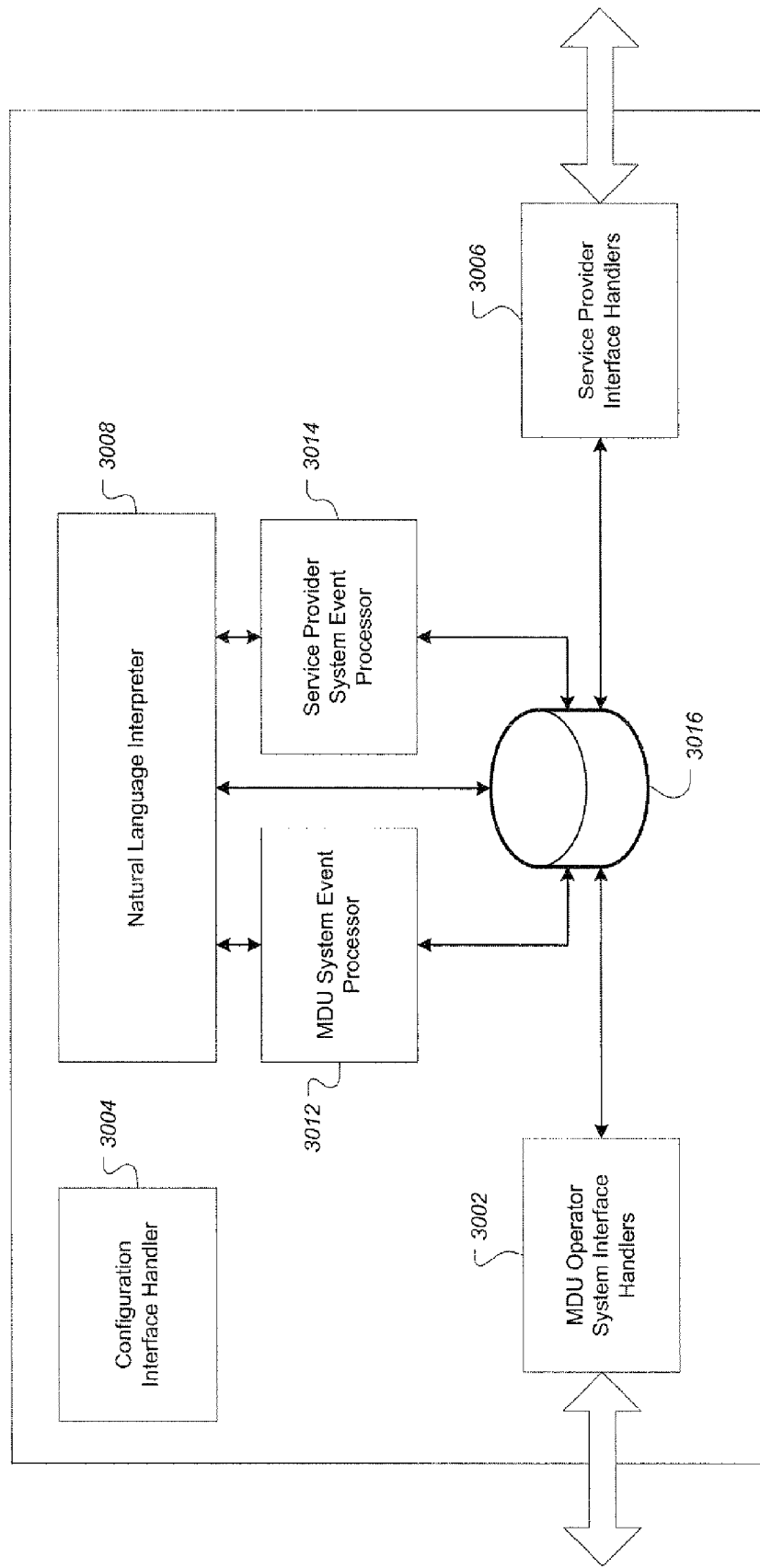
FIG. 3 is a detailed schematic overview of an exemplary illustrative non-limiting Interface system, such as shown at (2012) in FIGS. 2A and 2B.

FIG. 3 illustrates a more detailed view of an Interface system (3000). According to one implementation, the Interface system comprises: a plurality of MDU operator system interface handler components (3002;), an optional configuration interface handler component (3004), a plurality of service provider interface handler components (3006), a natural language interpreter component (3008), an MDU operator system event processor component (3012), a service provider event processor component (3014), and a database (3016). In a more specific implementation, as illustrated, each of an MDU operator system interface handler components (3002), service provider interface handler components (3006), MDU operator system event processor component (3012), and service provider event processor component (3014) are in bi-directional communication with the database (3016). The MDU operator system event processor component (3012) and service provider event processor component (3014) further are in bi-directional communication with the natural language interpreter component (3008).

The Interface system can be constructed using a commercial computer system, such as a PC, comprising a CPU, memory, hard drive, and other components typically found in this type of system as will be understood by those having ordinary skill in the art. Further, it can utilize a commercial operating system such as Linux or Microsoft Windows. Each Interface system and its components may be constructed using different languages or development methodologies, including, but not limited to, C/C++, Java, C#, and XML/XSLT. In one exemplary implementation, the Interface system is deployed as a stand-alone system, for example, as a network appliance. But it may be deployed as part of other systems deployed at an MDU operator's site. Alternatively, it may be deployed as an ASP model, where a service provider deploys a stand-alone system and manages the interconnection to an MDU operator and service provider systems. The advantages of providing the benefits of the architecture to MDU operators, tenants, and their service providers as an ASP include those of scale and increased efficiencies from a reduced staffing count.

The other components of the Interface system (3000) are described below. Each component can be implemented using methods and components well known to those having ordinary skill in the art.

MDU Operator System Interface

An MDU operator system interface handler component(s) support the interface between specific MDU operator systems and the Interface system. It translates specific requests from the MDU operator system event processor into commands and information appropriate to a specific MDU operator system and translates any results back into a "normal" form that can be used by the Interface system. An MDU operator system interface also takes unsolicited information received from an MDU operator system (for example, a tenant check-in notification), translates it into "normal" form, and forwards it to the MDU operator system event processor component for further processing.

Each MDU operator system interface may be a general purpose component for interacting with MDU operator systems, utilizing commercially available tools and libraries to provide format conversion and input/output. Each MDU operator system interface may be constructed using different languages or development methodologies, including C/C++, Java, C#, and XML/XSLT, MDU operator system interfaces of this type may use configuration information to determine how information is moved between the MDU operator system interface, the respective MDU operator system, and the MDU operator system event processor. Alternatively, an MDU operator system interface may be custom developed to interface with a specific MDU operator system.

In one exemplary implementation, an MDU operator system interface component is started when the Interface system is started. The configuration of this component is taken from configuration information written by the configuration interface handler component (3004), which is described below. In another exemplary implementation, multiple instances of an MDU operator system interface component are started as necessary. In one illustrative implementation, each instance of MDU operator system interface component operates as follows:

(1) Establishes a communication interface to an MDU operator system using the specified communication method.
(2) Verifies the communication interface with the specified MDU operator system by communicating with an MDU operator system.
(3) Establishes a communication interface to the MDU operator system event handler.
(4) Optionally verifies the communication interface with the MDU operator system event handler.
(5) Optionally starts threads and sub-processes for handling multiple simultaneous communications requests.
(6) Waits for a communication request from either an MDU operator system or the MDU operator system event handler.

In another illustrative non-limiting implementation, upon receipt of a request from the MDU operator system event handler (3010), an MDU operator system interface (3002) performs the following operations:

(1) Validates the request.
(2) Optionally logs the request.
(3) Translates the request into a format recognizable by an MDU operator system.
(4) Transmits the translated request to an MDU operator system.
(5) If a response is expected, an MDU operator system interface waits for a response from an MDU operator system. Upon receipt of the response, an MDU operator system interface translates the response into a form usable by the MDU operator system event handler, optionally logs the response, and forwards the translated response to the MDU operator system event handler. If a response is expected, but not received, then an MDU operator system interface logs the condition and takes the action(s) specified in its configuration information.

Upon receipt of an unsolicited input from an MDU operator system, an MDU operator system interface performs the following operations:

(1) Validates the input.
(2) Optionally logs the input.
(3) Translates the input into a form usable by the MDU operator system event handler.
(4) Forwards the translated input to the MDU operator system event handler.

The translations between input and output within an MDU operator system interface may be hard coded or may optionally be specified in one or more configuration files or databases.

Interactions between an MDU operator system interface and an MDU operator system may be instantiated by exemplary illustrative non-limiting implementations on a event or timed basis. When invoked on a timed basis, the interactions may include events stored but not previously communicated to the MDU operator system.

Configuration Interface Handler

In one exemplary illustrative non-limiting implementation, the optional configuration interface handler component (3004) provides the user interface for configuring the Interface system. In a more specific implementation, the configuration interface handler component is present only if there is an active configuration interface present on the Interface system. In a still more specific implementation, the configuration interface handler provides a screen-based user interface for configuring MDU operator system interfaces, service provider interfaces, translation rules, and for defining event-handling rules. The desired system configurations can be stored in persistent storage, for example, as a set of configuration files or as entries in a configuration table or tables in the database.

In a more specific exemplary implementation, the configuration interface handler provides the capability to configure and manage the storage of the configuration for the following attributes of the Interface system:

MDU operator system interface component associations with specific events and event handling rules.

Number and type of MDU operator system interface components to start.

Configuration of each MDU operator system interface component, including format conversion specifications, communication method specifications, and I/O specifications.

Associations between multiple dwelling unit MDU interfaces and service provider accounts, and specific equipment identifiers with specific multiple dwelling units.

Service provider interface component associations with specific events and event handling rules.

Number and type of service provider interface components to start.

Configuration of each service provider interface component, including format conversion specifications, communication method specifications, and I/O specifications.

Event handling rules

Events

Operational parameters and settings that control how the interface system operates.

An example of operational parameters being set includes the setting of the interval for "debouncing" PPV viewing events. In one example non-limiting implementation, a tag value pair with the tag="com.turnkey.eagle.importer.emailFileExport.duplicate HoursInterval" and the value set by the user is configured in a configuration table. The "com.turnkey.eagle.importer.emailFileExport.duplicateHoursinterval" tag identifies the configuration value that defines "debounce interval", e.g., the interval (in hours) over which multiple instances of a repeated event should be considered as one instance of an actual event.

Service Provider Interface

In one exemplary illustrative non-limiting implementation, the service provider interface component (3006) provides an interface between specific service providers and the Interface system. In a more specific non-limiting implementation, there are multiple instances of the service provider interface component in the interface system. Other implementations include those in which there is more than one service provider interface component per service provider, or multiple service provider interfaces may be shared by a single service provider interface component. In some implementations, the service provider interface component translates specific requests from the service provider event processor (3012) into commands and information appropriate to a specific service provider interface and translates any results returned on a service provider interface into a "normal" form that can be used by other components in the interface system. In still another exemplary implementation, the service provider component interface also receives unsolicited information received from a service provider interface (for example, a "pay-per-view started" event notification), translates it into "normal" form, and forwards it to the service provider event processor component for further processing.

Each service provider interface component may be a general purpose component for interacting with service provider system(s), utilizing commercially available tools and libraries to provide format conversion and input/output. Each service provider interface component may be constructed using different languages or development methodologies, including C/C++, Java, C#, and XML/XSLT. Service provider interface component of this type may use configuration information to determine how information is moved between the service provider interface component, the respective service provider interface, and the service provider event processor. Alternatively, a service provider interface component may be custom developed to interface with a specific service provider system or service provider interface.

In one illustrative implementation, the service provider interface component is started when the Interface system is started. The configuration of this component is taken from the configuration information written by the configuration interface handler component, and multiple instances of the service provider interface component are started as necessary. Each instance of service provider interface component operates as follows:

(1) Establishes a communication interface to the service provider's system(s) using the specified communication method (2) Verifies the communication interface with the specified service provider system(s) by communicating with the system(s).

(3) Establishes a communication interface to the service provider event handler.

(4) Optionally verifies the communication interface with the service provider event handler.

(5) Optionally starts threads and sub-processes for handling multiple simultaneous communications requests.

(6) Waits for a communication request from either the service provider system(s) or the service provider event handler.

Upon receipt of a request from the service provider event handler (3010), the service provider interface performs the following operations:

(1) Validates the request.

(2) Optionally logs the request.

(3) Optionally associate the request with service provider account, MDU tenant, or MDU interface.

(3) Translates the request to a format recognizable by the service provider's system.

(4) Transmits the translated request to the service provider's system.

If a response is expected, then the service provider interface waits for a response from the service provider's system. Upon receipt of the response, the service provider interface translates the response into a form usable by the service provider event handler, removing extraneous information and adding information from the tenant's profile as necessary, optionally logs the response, and forwards the translated response to the service provider event handler. If a response is expected but not received, the service provider interface logs the condition and takes the action(s) specified in its configuration information.

Upon receipt of an unsolicited input from a service provider system, the service provider interface performs the following operations:

(1) Validates the input.
(2) Optionally logs the input.
(3) Optionally associate the request with service provider account information, an MDU tenant, or an MDU tenant interface.
(4) Translates the input to a form usable by the service provider event handler.
(5) Forwards the translated input to the service provider event handler.

The translations between input and output within the service provider interface may be hard coded or optionally may be specified in one or more configuration files or databases.

In an exemplary illustrative non-limiting implementation, interactions between a service provider interface and a service provider system may be instantiated on a event or timed basis. When invoked on a timed basis, the interactions may include events stored but not previously communicated to the service provider's system.

Natural Language Interpreter

The natural language interpreter component (3008) translates "English-like" commands and configuration instructions into a form that is usable by the service provider and MDU operator system event processors (3010, 3012). For example, the instructions "Bill $10 for each unique PPV event per day" and "Combine multiple PPV events for the same PPV item into a single event" may take the form of an English sentence, may be described using a machine parseable grammar, or may be entered using a "fill in the fields" form. Components that translate these input formats are well understood by those having ordinary skill in the art, and may include semantic language interpreters and lexical parsing tools.

In one exemplary illustrative non-limiting implementation, for each case the "English-like" commands are translated to a machine-readable configuration and stored within the interface system. Preferably, the configuration information is stored in a flat file, using a coding structure such as XML. Alternatively, the configuration information is stored within the database.

Optionally, each command and configuration instruction may be associated with one or more events that are processed by other components of the interface system. The association between a command and specific events may be managed within each component, or may be stored together within the database. Each storage method is well understood by engineers.

Various commands may have a semantic-specific ordering to which they should be evaluated. Preferably, the order of evaluation is maintained within the event binding described above, so that event processing occurs naturally in the desired processing order. Alternatively, the ordering of commands may be managed independently at the cost of having each interface system component be responsible for determining and enforcing the desired implementation order of commands.

In other example non-limiting implementations, the values entered into the Natural Language Interpreter are directly entered into databases and configuration files of the Interface system. These values are used to control one or more aspects of the processing of events by the Interface system. In some more particular example implementations, the value entered into the Natural Language Interpreter may take the form of a stored procedure stored within the database, as described below.

MDU Operator System Event Processor

The MDU operator system event processor component (3010) manages interactions with one or more MDU operator systems, based in part upon rules defined by an MDU operator. Generally, these rules are entered through a configuration interface, are processed by the natural language interpreter, and are stored in the interface system's database or configuration files. As used here, the term "database" in this context is used in its most general meaning. Some events which the MDU operator system event processor component supports include:

Check-in event received from MDU operator system interface.

Check-out event received from MDU operator system interface.

Billing event from service provider event processor (if valid tenant, or if vacant).

Other events may be defined by an operator of the interface system. These events and their definitions are preferably stored with the rules bound to them. If the MDU operator system event processor receives an undefined event, its default procedure is to log the event and all relevant details for further action by the operator. Each of the above-listed events is described below in greater detail.

Check-In Event

In one implementation, when a check-in event is received from an MDU operator system indicating that an MDU unit has become occupied, the MDU operator system event processor locates the check-in rules defined in the database. The check-in rules describe the behavior of the Interface system when an MDU unit is occupied. After obtaining these rules, the MDU operator system event processor begins processing them to enable the provision of each of the services as specified by the rules. In one example, the check-in rule specifies that the Interface system should:

(1) Enable the MDU unit's cable service by notifying the cable service provider to provide cable service (including PPV and optional premium channels) to the MDU unit.
(2) Enable a VoIP telephone service by notifying a VoIP telephony service provider to provider VoIP service to the MDU unit.

Still other operations will be apparent to those having ordinary skill in the art.

Check-Out Event

In one non-limiting implementation, a check-out event is received from an MDU operator system, indicating that an MDU unit is no longer occupied. When a check-out event is received, the MDU operator system event processor locates the check-out rules defined in the database. The check-out rules describe the behavior of the Interface system when an MDU unit is occupied. After obtaining these rules, the MDU operator system event processor begins processing them to disable the provision of each of the services as specified by the rules. In one example, the check-out rule specifies that the Interface system should:

(1) Disable the telephone to prevent unauthorized long distance calls.

(2) Reset voice mail and other MDU operator systems to their default values.

(3) Notify all systems with a billing component to generate billing records for the MDU tenant.

The MDU operator system event provider then instructs the service provider event processor to de-provision the MDU unit using the above information.

Billing Event

In one exemplary illustrative non-limiting implementation, a billing event is received indicating that an item should be added to the bill for a specific MDU unit. The billing event may originate outside the Interface system, or it may be generated by the Interface system after processing one or more events from service providers or other MDU operator systems. In a more specific implementation, when a billing event is received the MDU operator system event processor locates the billing rules (preferably defined in the database). The billing rules describe the behavior of the Interface system when an item is to be billed to an MDU unit. After obtaining these rules, the MDU operator system event processor begins processing them. In one example, the billing rule services a PPV event and specifies that the Interface system should:

(1) Check to see if this event has been previously billed in the configured interval (e.g. a PPV de-bounce).

(2) Calculate the charge for the PPV event based upon the configuration information.

(3) Post the charge for the PPV event to the MDU billing system.

Billing events may be received for some time after a unit has been vacated. In one non-limiting exemplary implementation, an MDU operator defines how such billing events will be processed. For example, whether they are billed to the MDU tenant's folio, written down as a loss, etc. Similarly, the system processing for conditions when an event is received for a vacant unit are handled in accordance with MDU operator policies. Preferably, these types of events will generate a notification to the operator for immediate investigation and correction. An MDU operator policies are expressed as part of the rules surrounding the billing event.

Service Provider Event Processor

In one non-limiting implementation, the service provider event processor (3012) manages interactions with service providers via specific service provider interfaces and their respective service provider interface handler components (not shown). In a more specific non-limiting implementation, the service provider event processor component manages interactions with one or more service providers based in part upon rules defined by an MDU operator. Generally, these rules are entered through a configuration interface, are processed by the natural language interpreter, and are stored in the Interface system's database. Some events supported by the service provider event processor component include: a provision event received from the MDU operator system event processor and a de-provision event received from the MDU operator system event processor.

For example, when a provision request is received from the MDU operator system event processor, indicating that an MDU unit has become occupied, the service provider event processor first locates the provisioning rules defined in the database. The provisioning rules describe the behavior of the Interface system when an MDU unit is occupied. After obtaining these rules, the service provider system event processor begins processing them. For example, using the rule described above, the service provider event processor provider performs the following activities:

Provision Event

In one exemplary illustrative non-limiting implementation, a "provision" event is processed by the service provider event processor when one or more service providers are required to provide services to an MDU tenant. In one example, the service provider event processor processes a provision event in accordance with a "provision" rule defined in the database; and performs the following steps in order to process the rule:

(1) Obtain the provision rule from the database, optionally selecting from a set of provision rules using event information such as MDU unit, tenant information, and service provider.

(2) Log the provision event.

(3) Execute the provision rule, instructing the service provider interfaces as necessary to communicate with the service's providers and logging the results.

(4) Record the provisioning state in the database for later use.

An example of a provision rule might specify that the service provider event processor start by looking up the MDU unit information in the database, determining the service provider and MDU tenant interface ID (e.g., the set-top box ID for a cable service provider), and the VoIP phone MAC address associated with the VoIP phone in the MDU unit. After obtaining this information, the service provider event processor selects the service provider interface corresponding to the identified service provider and sends a provisioning request to the service provider interface handler. In this example, the service provider is a cable system provider such as Comcast. The request is sent to Comcast to provision the cable set-top unit and provide cable and PPV services, identifying the MDU unit and a set-top box ID. After the cable system is provisioned, the service provider event processor further requests the service provider interface to enable enhanced converged media services. This request may be routed using the same or a different service provider interface.

De-Provision Event

The de-provision event is processed by the service provider event processor to de-provision an MDU unit in an analogous manner to the provision event just described. Generally, most services to the MDU unit are disabled upon check-out of the tenant. However, some services may remain provisioned for a set period after check-out or may be de-provisioned by subsequent MDU operator command.

Database

The Interface system's database (3014) is preferably a relational database, such as provided by Microsoft SQLServer or mySQL. Alternatively, the system database could use other technologies, such as ISAM or even "flat" files to store system information. In one exemplary implementation, the database stores the following types of information:

Table descriptions.

Event logs—historical logs related to the processing of events.

Provisioning information—information related to MTU rooms, MTU tenant interfaces, and service provider account information.

Processing rules—rules for processing events.

Billing records—historical information related to billing transactions.

Event definitions—defines events handled by the Interface system.

Event-rule definitions—associates rules with events.

Other Components—stored procedures. Table descriptions

In one exemplary implementation, the Interface System's database comprises tables to organize important information. The specific table specifications and names are database language specific and their construction is understood by those skilled in the art:

MDU Table
Defines MDU operator information and internal ID.
Defines the Export increment schedule.
Contains the MAX last play time downloaded.
Contains the NEXT export time.
Defines the # of days to resend export information.
Account and MDUAccou ntTable
Contains the mapping between Service Provider Account Information, MDU Room Numbers, and CPE Addresses
Defines the relationship between the MDU and Account tables
EmaiiFileExportConfiguration_MDU Table
Defines the MDUs for export/import
Recipient List for email notifications (last 7 days)
Temp directory, File Name and Subject Line for emails
Constants Table
Defines system constants that configure the operation of the Interface System. Implemented as a set of tag-value pairs. Some example tag-value pairs used in examples herein are described below:

| Tag | Value |
|---|---|
| com.turnkey.eagle.importer.email FileExport.duplicateHoursInterval | Defines the number of hours used to determine if the same event for the same account is considered a duplicate for billing purposes (debounce interval). |
| PPV_Price | $ per PPV debounced PPV event |
| <service provider>.poll_for_events_interval | Time period to check a service provider for new events (by service provider) |
| <operator system>.poll_for_events_interval | Time period to check an operator system for new events (by operator system) |

One aspect of other components include stored procedures that provide database operations. In some implementations, it is advantageous for the Interface system to store information from one or more systems within the Interface system, and then process that information within the interface system before communicating it to another system. One such example is the process to "debounce" PPV events received from a service provider. In this example, each service provider event is stored in the Interface systems memory, preferably in the database, and is periodically processed by a stored procedure such the one shown below for a Microsoft SQLServer database:

```
CREATE PROCEDURE RemoveDuplicateCharges AS
DECLARE @hour_interval
INT
select @hour_interval = cast (constantvalue as int) from constants
where constantid =
'com.turnkey.eagle.importer.EmailFileExport.duplicateHoursInterval'
PRINT 'Hour Interval: '+cast(@hour_interval as nvarchar(4))
DECLARE @description
nvarchar (250)
DECLARE @accountid
int
DECLARE @play_key
INT
declare @eventtime
datetime
DECLARE @last_description
nvarchar (250)
DECLARE @last_accountid
int
DECLARE @last_play_13 key
INT
declare @last_eventtime
datetime
declare @eventcount
int
declare nextcharge cursor for SELECT accountid, eventtime,
description, play_key
FROM Charges c
WHERE datebilled is null and duplicate = 0
ORDER BY AccountID, Description, EventTime
select @last_description = null
select @last_accountid = null
select @last_play_key = null
select @last_eventtime = null
open nextcharge;
fetch next from nextcharge into @accountid, @eventtime, @description,
@play_key
while @@fetch_status = 0
BEGIN
BEGIN
if (@last_description is NOT null)
BEGIN
-- first, check against the last
if (@accountid = @last_accountid AND
@description = @last_description AND
@eventtime <= dateadd (hour, (0-@hour_interval), @last_eventtime))
BEGIN
print '\nSetting duplicate charge '+cast (@accountid as
nvarchar(25))+':'+@last_description+':'+cast (@eventtime as
nvarchar(20))+' as duplicate of '+cast(@last_eventtime as
nvarchar(20))
update charges set duplicate = 1 where accountid = @accountid and
description = @description and eventtime = @eventtime and play_key =
@play_key
END
ELSE
BEGIN
select @eventcount = null
SELECT @eventcount = count (*)
FROM    charges
WHERE  accountid = @accountid and
description = @description and
eventtime >= dateadd (hour, (0-@hour_interval), @eventtime) and
eventtime < @eventtime and
duplicate = 0
if (@eventcount > 0)
BEGIN
print '\nSetting duplicate charge '+cast (@accountid as
nvarchar(25))+':'+@last_description+':'+cast (@eventtime as
nvarchar(20))+' previous event count '+cast (@eventcount as
nvarchar(3))
update charges set duplicate = 1 where accountid = @accountid and
description = @description and eventtime = @eventtime and play_key =
@play_key
END
END
END
-- Update the last
select @last_description = @description
select @last_accountid = @accountid
select @last_play_key = @play_key
select @last_eventtime = @eventime
END
fetch next from nextcharge into @accountid, @eventtime, @description,
@play_key
END
CLOSE nextcharge
DEALLOCATE nextcharge
```

Other optional components of the interface system include report generation, automatic reconciliation of billing events, and components related to the gathering, storing, and distributing of marketing information between an MDU operator and its service providers. The report generation capabilities of the interface system are provided using a commercial report generation software package such as Crystal Reports. Still other components and capabilities will be apparent to those having ordinary skill in the art.

Other Exemplary Illustrative Non-Limiting Aspects of the Interface System

In another exemplary illustrative non-limiting implementation, the interface system provides a trusted, automatic reconciliation of services provided and monies billed in cases where service provider compensation is tied to monies received instead of a fixed per unit fee. In this implementation, the interface system integrates the billing information using the same mechanism as described above for customer profile information. The billing information is collected and integrated as part of the customer profile, and the resulting single source of billing information is shared with the service providers as necessary. The interface system may associate billing transactions in the logs (e.g., log entries from processing a billing event) as support detail for this integrated billing information. Preferably, the automatic, trusted reconciliation information may be provided as a report, using the above described report-writing component. Alternatively, the reconciliation information may be provided through the service provider interface for automatic integration with service provider systems.

Business Use Cases

This section describes the business use cases and methods of operating for the Interface system.

In an exemplary illustrative non-limiting implementation, the Interface system supports a distributed billing system in which the service provider provides notification of events representative of actions taken by an MDU tenant. In some implementations, the event is representative of an MDU tenant selecting PPV content on their MDU tenant interface equipment, or by making the selection on one or more devices operably connected to an MDU tenant interface equipment. Operations in this exemplary process include:

(1) Take event from service provider,
(2) Debounce events,
(3) Associate event(s) with multiple dwelling units, multiple dwelling unit tenants, or MDU tenant interfaces,
(4) Submit billing information to MDU operator,
(4) MDU operator collects fees from MDU tenants,
(5) Reconcile collected fees with service provider, splitting them as previously agreed.

In a second example implementations, the Interface system provides mechanisms for reconciling duplicate events. Duplicate events are those that occur when a MDU tenant takes an action, such as selecting PPV content to view. In some instances, an MDU tenant may select a first piece of PPV content, change channels to a different content, and then change back to the first piece of PPV content. In some implementations, the second change to select PPV content may result in a duplicate PPV event at the service provider. A process, such as "debouncing" (described above) eliminates these duplicate events.

The Interface system permits the automatic application of debounce and billing rules. For example, a process by which duplicate PPV events are detected is shown below:

(1) Download (or store) PPV from service provider into Interface device (2) On a periodic basis (as set by a configuration value, as described above), the PPV events are debounced and duplicate events ignored.

(3) On a periodic basis, debounced events are associated with a price defined in the configuration of the Interface system, and forwarded to a MDU operator system for billing, (4) the MDU operator collects billed fees for the PPV events from MDU tenants. If fees are not collected, the Interface system is notified that a fee was not collected.

(5) On a period basis, the PPV events are reconciled with the service provider to determine an amount to pay from between the service provider and the MDU operator.

The values for determining the interface frequences between the interface system and operator systems and provider systems, as well as the debounce interval and reconciliation intervals, may be set in a configuration instead of being hard coded. Note that a plurality of each configuration value may be set and associated with different events, service providers, and MDU operator systems.

CONCLUSION

The exemplary illustrative non-limiting architecture will be appreciated by those having ordinary skill in the art to enable at least the following advantages:

Taking usage and billing events from the service provider, aggregating and filtering them, and providing an MDU operator's billing system event and billing information.

Permitting the MDU to use existing systems, reconciling billing and charge backs back to service provider.

Providing analysis of service provider services used and service price points.

Providing pre-configured services from service providers for MDU tenants.

Enabling fee splitting arrangements based upon value added content (e.g., PPV).

While the technology herein has been described in connection with exemplary illustrative non-limiting implementations, the invention is not to be limited by the disclosure. The technology herein will thus be recognized by those having ordinary skill in the art to provide systems, methods, and apparatus that meet and exceed the deficiencies of the prior art. The invention is intended to be defined by the claims and to cover all corresponding and equivalent arrangements whether or not specifically disclosed herein.

What is claimed:

1. A system for facilitating the provision of goods and services to a multiple dwelling unit (MDU) tenant of a network operated by an MDU operator, comprising:

a. at least one service provider that is configured to provide goods and services in response to electronic requests for said goods and services;

b. an MDU tenant interface located in at least one of said dwelling units, said MDU tenant interface being configured to communicate MDU tenant requests for goods and services to at least one of said MDU operator and said service provider; and c. a coordinating site that is configured to provide a provision interface operably connected to said service provider and said MDU tenant interface to enable said service provider and said MDU tenant to arrange for the provision of said goods and services, said coordinating site including at least one interface operatively connected to said MDU operator and said service provider, said interface system comprising a combination hardware system and software application providing at least one logical interface with said service provider, said coordinating site permitting the MDU operator to provide billing services on behalf of said service provider, said coordinating site including a provision event handler that interfaces with the at least one service provider, and further includes a component that posts provision events for the MDU operator to bill to MDU tenants.

2. The system of claim 1, wherein said coordinating site is further configured to provide information related to at least a portion of the consumption of said goods and services by said MDU tenant to said MDU operator.

3. The system of claim 1, wherein said each of said MDU tenant interface, said provision interface, and said coordinating site is configured to support IP-based services.

4. The system of claim 1, further comprising physical connections between said MDU tenant interface, said service provider, and said provision interface.

5. The system of claim 1, wherein said coordinating site at least one interface provides for at least one of billing, occupancy, and loyalty systems.

6. The system of claim 1, wherein said coordinating site further includes a configuration interface for said MDU operator.

7. A multiple unit dwelling comprising the system of claim 1.

8. A method for transacting services between one or more providers of goods and services and a multiple dwelling unit (MDU) tenant using at least one computing system operated by an MDU operator, comprising:
  providing an MDU tenant interface in at least one dwelling unit, said MDU tenant interface being configured to communicate MDU tenant requests for goods and services to said service provider;
  providing a coordinating site to coordinate the provision of at least one aspect of said goods and services between said service provider and said MDU tenant, and
  using said coordinating site to (a) provide at least one logical interface with said service provider that permits the MDU operator to provide billing services on behalf of said service provider, (b) at least in part handle pay-per-view provision events, and (c) post pay-per-view events for the MDU operator to bill to MDU tenants, whereby said MDU operator collects fees from MDU tenants for pay-per-view provision events and splits collected fees with the at least one service provider.

9. The method of claim 8, further comprising providing at least one service from an MDU operator.

10. The method of claim 8, further comprising providing a network interface port configured to allow said service provider to communicate with said MDU operator.

11. The method of claim 8, further comprising enabling the provision of a service from said service provider to said MDU tenant interface.

12. The method of claim 8, further comprising disabling the provision of a service from said service provider to said MDU tenant interface.

13. The method of claim 9, wherein said service provided by said MDU operator includes a billing service.

14. The method of claim 8, further comprising providing said MDU operator information related to at least a portion of the consumption of said goods and services by said MDU tenant to said MDU operator.

15. The method of claim 14, wherein said service provided by said MDU operator includes a billing service.

16. The method of claim 8, further comprising translating between information provided by said service provider and information stored by said MDU operator.

17. The method of claim 16, further comprising associating information provided by said service provider to a specified dwelling unit.

18. The method of claim 17, further comprising providing said MDU operator information related to at least a portion of the consumption of said goods and services by said MDU tenant to said MDU operator.

19. The method of claim 18, wherein said service provided by said MDU operator includes a billing service.

* * * * *